United States Patent [19]
Wolff

[11] Patent Number: 4,822,377
[45] Date of Patent: Apr. 18, 1989

[54] METHOD FOR SEALING AN ELECTROCHEMICAL CELL EMPLOYING AN IMPROVED REINFORCED COVER ASSEMBLY

[75] Inventor: Merle Wolff, Rochester, Mich.

[73] Assignee: Energy Conversion Devices, Inc., Troy, Mich.

[21] Appl. No.: 157,190

[22] Filed: Feb. 18, 1988

[51] Int. Cl.[4] ................... H01M 2/12; H01M 10/38
[52] U.S. Cl. .................... 29/623.2; 29/422; 29/731; 429/54
[58] Field of Search ............ 429/53, 54, 163, 164, 429/171, 172, 174, 185; 29/623.2, 730, 731, 422; 220/208, 209

[56] References Cited
U.S. PATENT DOCUMENTS

| | | | |
|---|---|---|---|
| 3,262,819 | 7/1966 | Belove | 429/56 |
| 3,415,690 | 12/1968 | Richman | 429/56 |
| 3,861,960 | 1/1975 | Parker et al. | 29/623.2 |
| 3,986,083 | 10/1976 | Carino | 429/54 X |
| 3,994,749 | 11/1976 | Decker et al. | 429/53 |
| 4,271,241 | 6/1981 | Hooke et al. | 429/54 |
| 4,523,376 | 6/1985 | Thibault et al. | 29/623.2 |

Primary Examiner—Anthony Skapars
Attorney, Agent, or Firm—Kenneth M. Massaroni; Richard M. Goldman; Marvin S. Siskind

[57] ABSTRACT

Disclosed is a resealable vent, reinforced cover assembly for sealing a rechargeable electrochemical cell. Also disclosed herein, is a method of fabricating a reinforced cover assembly for a rechargeable electrochemical cell, a method of employing said cover assembly to seal a rechargeable electrochemical cell, and a vent, rechargeable electrochemical having a hydrogen storage alloy electrode and a resealably vented, reinforced cover assembly.

5 Claims, 5 Drawing Sheets

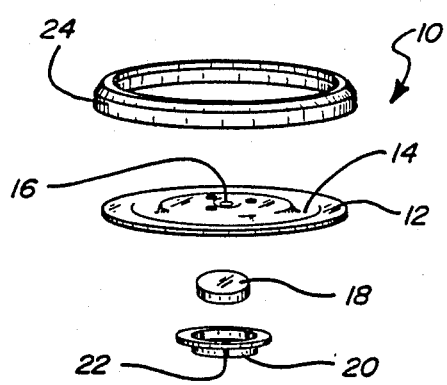
FIG. 1
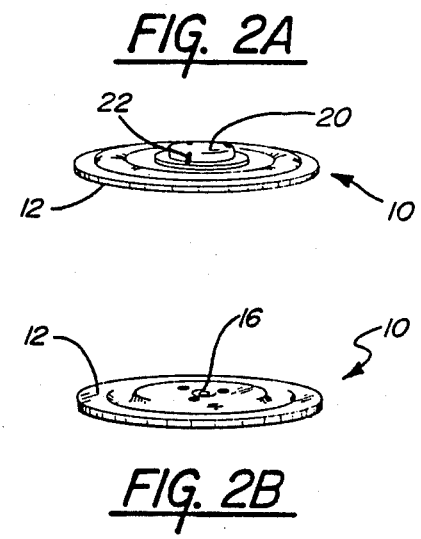
FIG. 2A
FIG. 2B
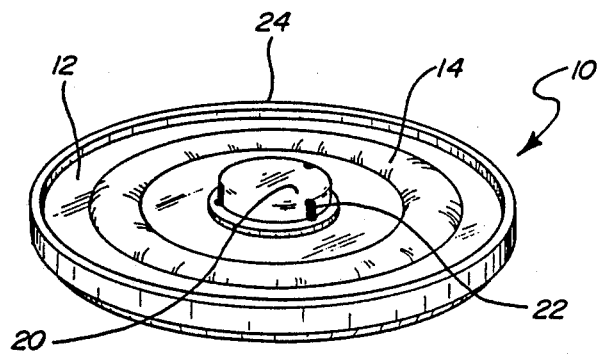
FIG. 3A
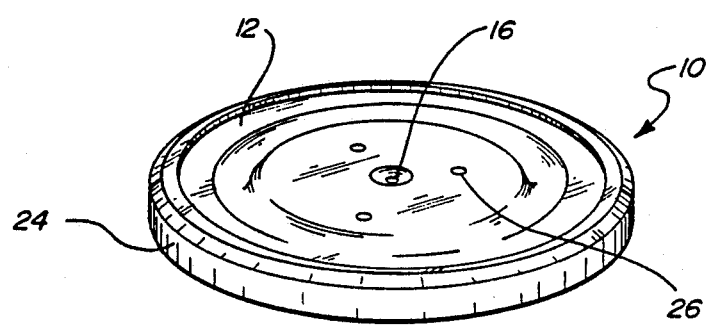
FIG. 3B

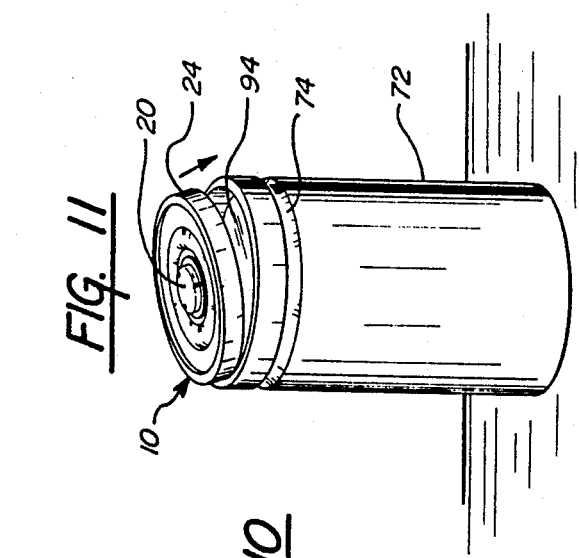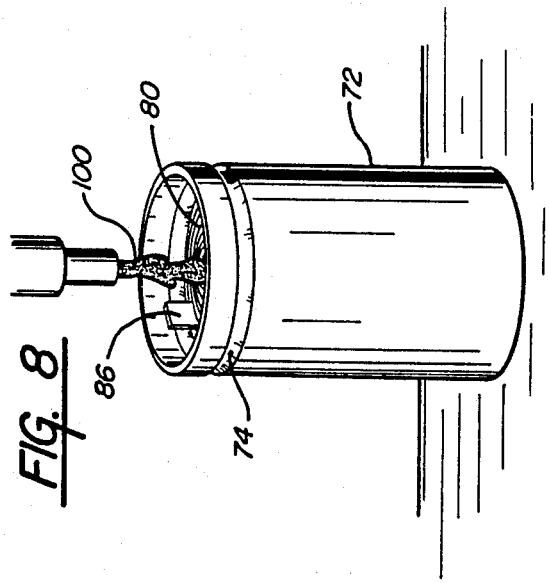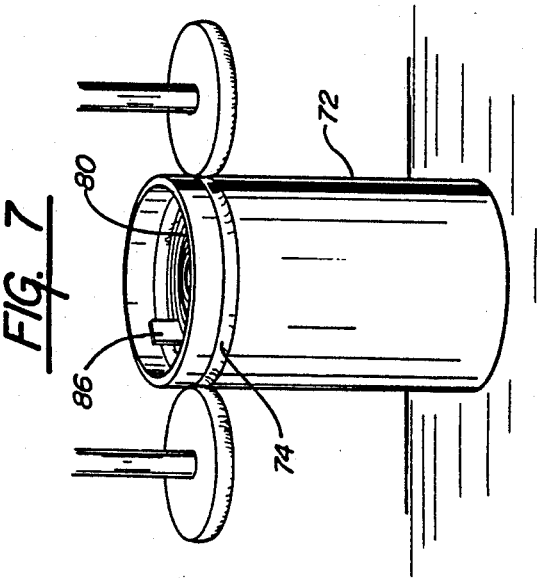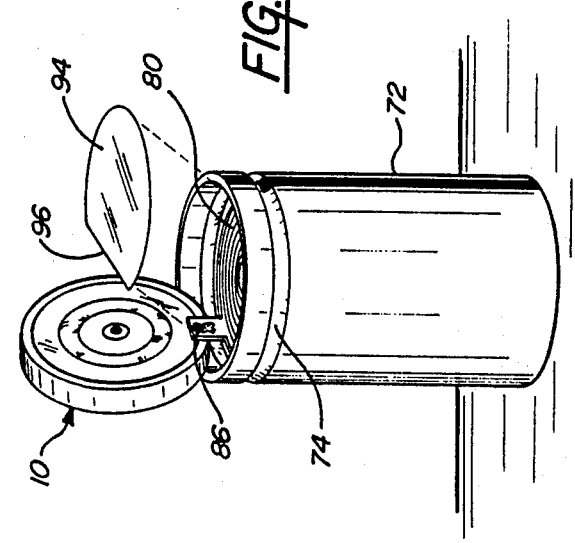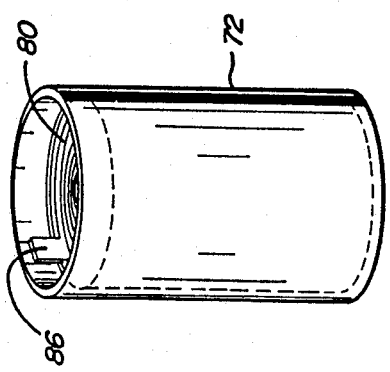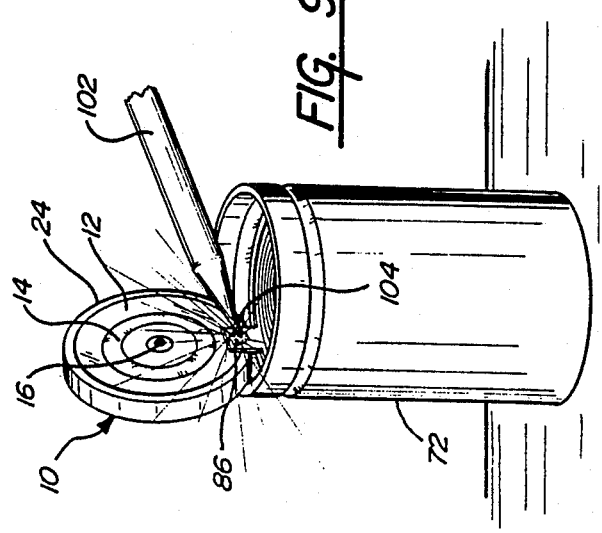

METHOD FOR SEALING AN ELECTROCHEMICAL CELL EMPLOYING AN IMPROVED REINFORCED COVER ASSEMBLY

FIELD OF THE INVENTION

The present invention relates to rechargeable, cylindrical electrochemical cells. More particularly, the invention relates to rechargeable cells with hydrogen storage negative electrodes and having improved reinforced, resealable vent cover assemblies, methods of fabricating the resealable vent cover assemblies, and designs and methods of fabricating resealable vent, cylindrical cells incorporating the improved, reinforced, resealable vent cover assembly.

BACKGROUND OF THE INVENTION

Rechargeable electrochemical cells are designed for use in applications which are light-weight and portable, require long operating life, and are incompatible with requirements of periodic maintenance. They may be used as direct replacements for primary double AA, C and D cells in numerous consumer devices such as calculators, portable radios and flashlights. They are more often integrated into the form of a sealed power pack designed to interface with or be an integral part of a specific device.

The rechargeable electrochemical cell is ideally suited to serve as a portable power source due to its small size, light-weight, high power capacity and long operating life. The rechargeable cell is an "install and forget" power source. With the exception of periodic charging, a rechargeable cell will perform without attention, rarely becoming the limiting factor in the life of the device it powers.

Secondary cells using a rechargeable hydrogen storage negative electrode are known in the art. See, for example, U.S. Pat. Ser. No. 4,551,400 for HYDROGEN STORAGE MATERIALS AND METHODS OF SIZING AND PREPARING THE SAME FOR ELECTROCHEMICAL APPLICATIONS the disclosure of which is incorporated herein by reference. Hydrogen storage cells operate in a different manner from lead-acid, nickel-cadmium or other prior art battery systems. Hydrogen storage electrochemical cells utilize a metal hydride negative electrode that is capable of reversibly electrochemically storing hydrogen. In one exemplification the cell employs a positive electrode of nickel hydroxide material, although other positive electrode materials may be used. The negative and positive electrodes are spaced apart in an alkaline electrolyte, and may include a suitable separator, spacer, or membrane therebetween.

Upon application of an electrical current to the negative electrode, the negative electrode material (M) is charged by the electrolyte decomposition of water to form the hydride and an OH-ion:

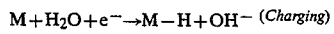

Upon discharge, the hydride is decomposed to release hydrogen within the cell, reacting with OH-ion to form water, and releasing an electron to the external circuit to provide an electric current:

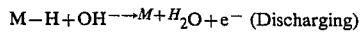

The negative electrode reactions are reversible.

The reactions that take place at the positive electrode are also reversible. For example, the reactions at a conventional nickel hydroxide positive electrode as utilized in a hydrogen rechargeable secondary cell or battery are:

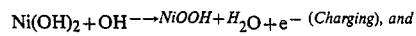

Hydrogen storage negative electrode cells are designed to operate with a nickel hydroxide positive electrode and a hydrogen storage alloy negative electrode, separated by non-woven, felted, nylon or polypropylene separator. The electrolyte is generally an alkaline electrolyte, for example, 20 to 40 weight percent potassium hydroxide, where lithium hydroxide may also be present in limited quantity.

A cell utilizing an electrochemically rechargeable hydrogen storage negative electrode offers important advantages over conventional secondary cells. Rechargeable hydrogen storage negative electrodes offer significantly higher specific charge capacities (ampere hours per unit mass and ampere hours per unit volume) than do either lead negative electrodes or cadmium negative electrodes. As a result of the higher specific charge capacities, a higher energy density (in watt hours per unit mass or watt hours per unit volume) is possible with hydrogen storage batteries than with the prior art systems, making hydrogen storage cells particularly suitable for many commercial applications.

Hydrogen storage cells are of two types, sealed cells and vented cells. In addition to differences in their basic construction implied by nomenclature, the two types of cells differ in their modes of operation. During normal operation, a sealed cell does not permit the venting of gas to the atmosphere. By way of contrast, in a vented cell, venting may be part of the normal operating behavior. As a result of this difference the vent assemblies associated with each type of cell are quite different from each other, and the amounts of electrolyte in the cell container relative to the electrode geometry are significantly different.

Sealed cells are generally manufactured in many configurations, predominantly including cylindrical and rectangular. Sealed cells are designed to operate in a starved electrolyte configuration. That is sealed cells are designed to operate with a minimum amount of electrolyte. The cell enclosure for a sealed cell is normally a metal enclosure designed for operation at a typical cell operating pressure that can be of up to about 100 pounds per square inch absolute or even higher. Sealed cells are characterized by the substantial absence of any required maintenance, and even one time venting cells require some periodic maintenance.

By way of comparison, vented cells, which have a nickel hydroxide positive electrode, and a hydrogen storage alloy negative electrode, typically have a woven or non-woven separator, e.g., of nylon or polypropylene. The vented cell differs most strongly from the sealed cell in that it is operated in a flooded condition. By a flooded condition is meant that the electrodes are completely immersed in, covered by, and wetted by the electrolyte. Thus, such cells are sometimes referred to as "flooded cells." A vented cell is further differentiated from a sealed cell in that the vented cell is designed for normal operating pressures of only up to about 25 pounds per square inch, after which excess pressures are relieved by a vent mechanism.

The discharge capacity of the nickel positive electrode is limited by the amount of electrolytes the amount of active material and charging efficiencies. The charge capacity of the negative, hydrogen storage alloy electrode is limited by the amount of active material used since its charge efficiency is nearly 100 percent until a nearly full state of charge is reached. To maintain the fullest capacity of the hydrogen storage electrode, adequate precautions must be taken to avoid oxygen rcombination or hydrogen evolution before full charge is accomplished. This is generally accomplished by providing an excess of negative electrode material. However, precautions must be taken in design and fabrication of sealed cells to avoid affects of over-pressurization associated with overcharge at dangerously high charge rates.

Rechargeable sealed cylindrical cells use a cylindrical nickel-plated steel case as the negative terminal and the cell cover as the positive terminal. The electrodes, are wound to form a compact "jelly roll" with the electrodes of opposite polarity isolated from each other by a porous separator. An insulator separates the positive cover from the negative cell can.

Conventional, cylindrical, rechargeable cell construction relies upon a tab which is extended from one point on each plate. This creates a single current path through which current must be distributed to the entire electrode area during charging and discharging.

While rechargeable cells have many useful applications, there are many instances in which damage may occur to the cells of the type described hereinabove. For instance, during periods of overcharging for extended lengths of time, excess pressure can be generated inside the cell can of the rechargeable cell. As the pressure of these gases increases, so also does the danger of an explosive failure. Failure, e.g., explosive failure, may occur at that point in time in which the internal pressure of gases surpasses the pressure which the cylindrical cell can is capable of withstanding.

Cylindrical, rechargeable cells of the prior art included a "one time only" venting mechanism where for example, a rupturable diaphragm and blade apparatus was employed. As internal cell pressure increased, the blade was forced against the diaphragm. As the pressure further increased, the blade punctured the diaphragm, allowing excess gases to escape through the ruptured diaphragm. This destructive type of venting mechanism was both unpredictable from batch to batch and from cell to cell within a batch. Moreover, destructive venting is good for only one excess pressure situation. After the diaphragm is punctured it cannot even hold normal cell operating pressures. In one exemplification, the diaphragm is punctured by an upward driven plunger. In another exemplification the diaphragm is forced upward towards the incising blade. As the internal cell pressure reaches the critical level, i.e., as the diaphragm reaches a critical deformation, the diaphragm is forced against the incising blade which would thus puncture the diaphragm, allowing the escape of accumulated cell pressure. An example of this type of device is fully disclosed in U.S. Pat. No. 3,415,690 incorporated herein by reference.

One shortcoming present in this and other methods of venting rechargeable electrochemical cells is that the venting mechanism present thereon was a "one time only" mechanism. Once open, the electrolyte material inside said rechargeable cell is exposed to the surrounding atmosphere. The electrolyte levels would be disturbed and thus the ability of the cell to retain and dispense an electrochemical charge would be deleteriously effected. Another shortcoming was the dependence of venting on the movement of a thin, deformable diaphragm against the incising tooth.

Other prior art venting assemblies included square or polygonal shaped rubber stoppers, attached to a vented plate at three of the square's four corners. This assembly proved beneficial in that it was not a "one time only" mechanism. Unfortunately, this assembly either failed to reliably vent at a given internal cell pressure or "stuck" open thereby causing the evaporation of the electrolyte material. This failure is attributable to the formation of a "pocket" by the stopper which prevented cell gasses from properly venting. The result, of course, was failure of the rechargeable cell. An example of this type of ventable cover assembly is fully disclosed in U.S. Pat. No. 3,994,749, incoporated herein by reference.

In addition to the shortcomings inherent in the vent plugs of the prior art, cell cover plates of the prior art were also deficient in their design. Specifically, cell cover plates of the prior art lacked the ability to exert a uniform outward force in response to radial compression. This inability required excessive pressures be applied to said plates to effect an air-tight seal between the cover plate and the cell can. This excessive pressure often exceeded the shatter point of the cover plate, the insulating ring or both, thus causing failure of the seal. Typical cover assemblies lacking the ability to exert responsive force are disclosed, for example, in U.S. Pat. Nos. 3,986,083 and 4,271,241 both of which are incorporated herein by reference.

There is therefore a need to develop an easily sealable cover assembly including a venting mechanism whereby excessive internal cell pressures can be vented off or released from the rechargeable cells at predictable pressures without destruction of the cell, as by permanently exposing the electrolyte inside the electrochemical cell to surrounding ambient conditions. Especially important is the requirement that in a production run of many cells, the venting mechanism be capable of repeatably venting at a uniform internal cell pressure.

BRIEF SUMMARY OF THE INVENTION

There is disclosed herein a sealed cylindrical, resealably vented electrochemical cell for storage of electrochemical energy. The electrochemical cell comprises: a positive electrode having a nickel hydroxide electrode plate, e.g., of sintered nickel material, which is subsequently impregnated withnickel hydroxide material; a negative electrode including a plate of a hydrogen storage alloy material; a separator means operatively disposed between said positive and negative electrodes and adapted to electrically insulate them from one another; an electrolyte material in contact with said positive and negative electrodes and said separator means; a cylindrical cell can into which the electrodes, the separator and the electrolyte are disposed in operative relationship; top and bottom insulator pads for electrically isolating the electrodes and a reinforced resealable vented cover assembly, electrically insulated from said cell can, and adapted for sealing said electrodes, separator and electrolyte in the cell can. The cover assembly may further include a reinforced cover plate, as described hereinabove, having a vent perforation formed therethrough and having a vent plug means disposed over said perforation and held in place by means of a vent plug cap attached to said cover plate.

The positive electrode is a sintered nickel material which is subsequently impregnated with nickel-hydroxide and formed in elongated electrode form. The negative electrode is also an elongated plate of hydrogen storage material comprising a multiphase, multicomponent, reversible electrochemical hydrogen storage alloy including titanium, vanadium, zirconium, nickel and chromium. The hydrogen storage alloy is adapted to electrochemically charge and discharge hydrogen in an aqueous alkaline media.

The separator means disposed between said positive and negative electrodes is preferably a non-woven fabric such as nylon having a thickness of between 0.005 and 0.020 inches. The thickness of the separator material must be thick enough to avoid shorting out between said electrodes, and thin enough to avoid high resistance. Additionally, said separator should be ion permeable. The electrolyte solution in said electrochemical cell is typically an aqueous alkali metal hydroxide solution, adapted to facilitate electrochemical reactions at both the positive and negative electrode. The positive and negative electrode are arranged parallel to one another with a sheet of separator disposed on either side of both of them. The electrodes and separator are then wound into a rolled configuration so as to assume a jelly roll configuration such that the outermost layer of said roll is the negative electrode.

Thereafter, the bottom insulator pad, the electrode roll and the top insulator pad are disposed into the cylindrical cell can so that the negative electrode is in contact with said cell can. At a level above the level of the electrode roll, a reinforced sealing lip is formed in said cell can so as to provide support for the reinforced cell cover assembly which will subsequently be attached thereon.

The reinforced cell cover is in itself a resealable vented cover assembly for sealing the electrodes, the separator, and the electrolyte in the cell can, and includes a reinforced cover plate having a vent perforation formed through it. The vent cover plate assembly further includes a vent plug made out a rubber compound material disposed over the vent perforation and being held to said cover plate by means of a vent plug cap which is metallurgically joined, e.g., projection welded to said cover plate. Sealably affixed along the circumferential surface of said cover plate is an electrically insulating seal ring, which ring acts to electrically insulate said reinforced cover assembly from the cell can. The cover plate includes an axial stiffening rib which exerts a uniform force outward toward the circumferential edges of the cover plate in response to radial compression applied thereto. The reinforced cover assembly with insulating ring is disposed upon an interior sealing lip which has previously been formed as an inwardly extending lip in the cylindrical cell walls of the cell can. The cell can walls are then bendably deformed so as to close over and upon said cover assembly. As the cell walls are closed upon the cover plate of the cover assembly, they are electrically insulated therefrom by means of the insulating ring attached to the circumference of the cover plate. Also, the insulating seal is virtually assured since the stiffening rib maintains a constant, uniform outward pressure against the insulating ring and cell walls.

There is also disclosed herein a method of sealing a cylindrical, ventable, electrochemical cell. The method of sealing the cell comprises the steps of assembling the electrodes and the separator means in a jelly roll configuration so that the negative electrode forms the outermost layer of said roll; disposing the electrode roll, the insulator pads and the electrolyte solution in the cell can so that only the negative electrode contacts the outside of the cell can; bendably deforming a cylindrical wall portion of the cell can at a level which is above the electrode roll so as to form a stiffened sealing lip; disposing a reinforced cover assembly atop said sealing lip in contact with the positive electrode and then bendably deforming the cylindrical wall portion, of the cell can above the sealing lip so as to close down upon the cover assembly.

In a preferred exemplification the electrodes disposed in the electrode roll further include electrode contact tabs. The tabs are affixed to the electrodes and are oriented such that when the electrodes are in their rolled configuration, the negative contact tab protrudes from one end of the electrode roll while the positive electrode tab protrudes from the opposite end of the electrode roll. Additionally, it is desirable to place the insulator pads on the top and bottom of the electrode rolls, such pads are adapted so that the electrode tabs mentioned above extend therethrough.

Thereafter, the electrode roll is disposed in the cylindrical cell can such that the negative contact tab makes contact with the bottom of the cell can, with the rest of the electrode roll insulated therefrom by means of the insulator pad.

The method of sealing the cylindrical cell can includes the additional steps of providing a reinforced cover plate having a vent perforation formed therethrough; disposing a deformable, ellipsoidal vent plug atop the vent perforation which vent plug is compressibly deformable in response to pressure which may build up inside the electrochemical cell; and affixing a vent plug cap having at least one vent hole formed therethrough over said vent plug and in contact with said cover plate, affixed there preferably by means of a weld. A reinforced cover assembly of the type described hereinabove is then positioned on the stiffened sealing lip previously formed in the cylindrical cell can, and the positive electrode tab is then joined to said cover assembly so as to form an electrically conductive connection. The cover assembly is then affixed with a compressible insulating ring along the circumference of that plate so as to form a seal between the cover plate and additionally to insulate the cover plate from the cell. Finally, the method recited hereinabove requires the further steps of folding the wall portions above the sealing lip to a first angle, which angle is less than 90 degrees from the wall portions original position; pressing the folded portion over so as to assume a 90 degree orientation to the rest of the cell walls, and curling the folded portion over and upon said insulating ring of said cover plate so as to completely seal said electrolytic cell. It is important that the seal made thereupon is capable of withstanding pressures in excess of at least 350 pounds per square inch and up to as much as 2000 pounds per square inch inside the cylindrical cell. Additionally, the vent plug employed atop the vent perforation of the cover assembly must be compressibly deformable in response to internal cell pressures in the range of 300–400 pounds per square inch, thus, allowing internally generated cell gases to vent before said cell reaches explosive malfunction.

BRIEF DESCRIPTION OF THE DRAWINGS

FIG. 1 is an exploded perspective view of the reinforced cover assembly described herein, said cover assembly including a reinforced cover plate, a vent plug, a vent/plug cap and an insulating ring;

FIG. 2A is a top perspective view of the partially assembled reinforced cover assembly of FIG. 1, excluding the electrical insulating ring, FIG. 2B illustrates a bottom perspective view of the reinforced cover assembly of FIG. 2A;

FIG. 3A is a top perspective view of a fully assembled reinforced cover assembly, while FIG. 3B is a bottom perspective view of a fully assembled cover assembly;

FIGS. 6 through 11 illustrate in stylized perspective view the steps involved in the method of assembling and sealing a rechargeable, electrochemical cell.

DETAILED DESCRIPTION OF THE INVENTION

Figure 4:
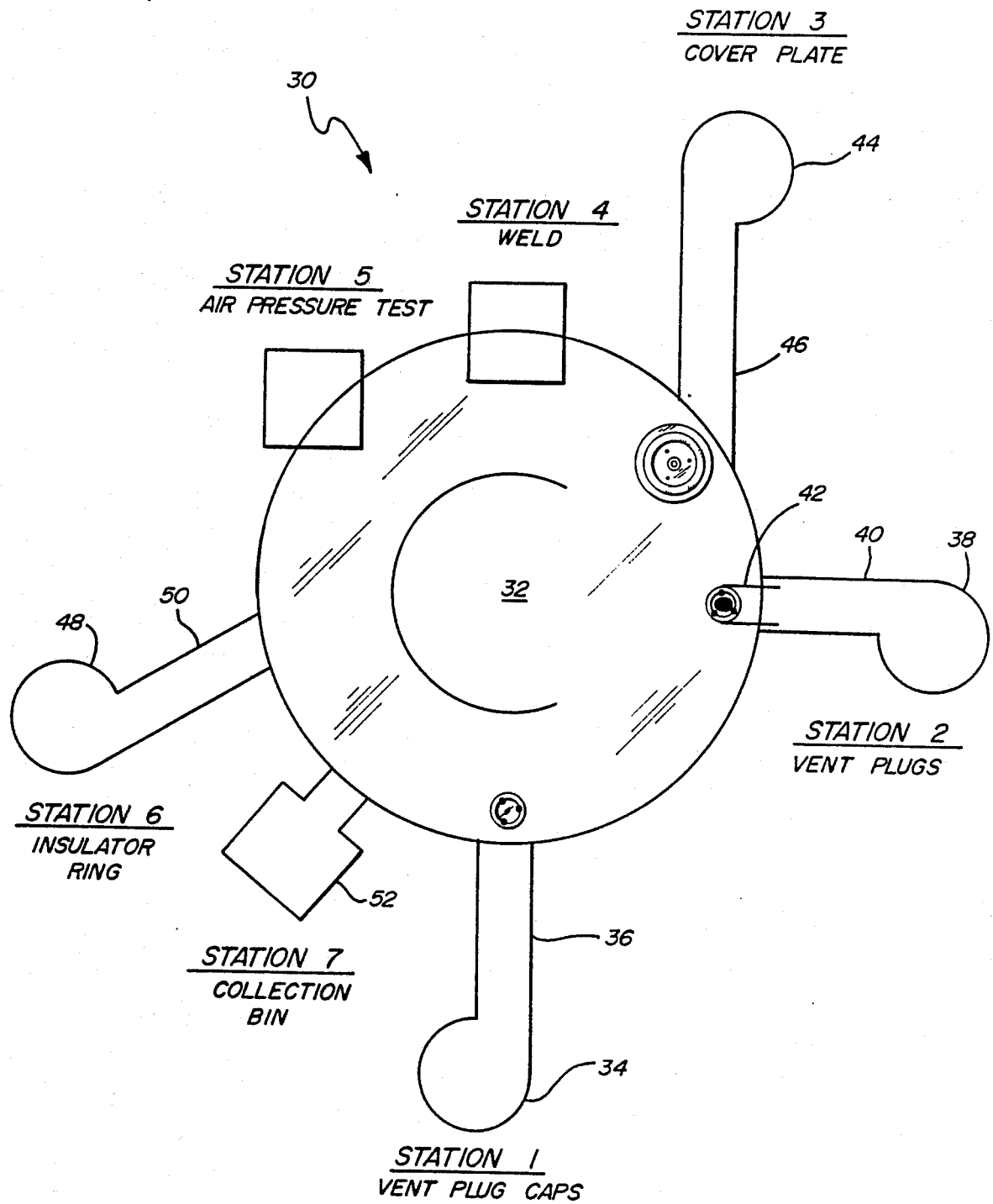
FIG. 4 is a stylized, top plan, perspective view of the processing stations of the method for assembling the reinforced cover assembly of FIG. 1.

FIG. 1 illustrates the component parts of the reinforced cover assembly for a cylindrical electrochemical cell. The reinforced cover assembly 10 has four separate components. The first component is a circular, reinforced cover plate 12, typically fabricated from a metallic material. The metallic material is electrically conductive. It may be steel, nickel, copper, or the like, and is preferably nickel plated steel.

The cover plate 12 further includes a stiffening rib 14. The stiffening rib 14 serves to reinforce the plate 12 in the event of excessive internal cell pressures. The stiffening rib 14 is further adapted to exert a uniform outward force extending towards the circumferential edge thereof, particularly in response to radial compression. This outward force exerted by the stiffening rib 14 represents a significant improvement in the art, specifically, with regard to closure of an electrochemical cell. More particularly, in cell covers of the prior art, it was necessary, in order to assure a complete seal, to compress the cell can of said electrochemical cells onto the covers at such high pressures as to reach or exceed the shatter point of the electrically insulating ring 24, (described in detail hereinbelow). The cover assembly 10, by virtue of the stiffening rib 14, described herein, exerts an outward force in response to radial compression, and thus can affect a uniform, electrically insulating seal without putting excessive, damaging pressures on the insulating ring 24, as often happened in covers of the prior art. The cover plate 12 further includes a vent perforation 16 which typically takes the form of a perforation or hole formed approximately in the center of said cover plate 12.

The reinforced cover assembly 10 also includes an elliptical or ellipsoidol, elastically compressably deformable vent plug 18, (though other non-parallel sided shapes may also be employed). The vent plug 18 is disposed atop the vent perforation 16 of the cover plate 12. The vent plug 18 is formed of an injection moldable rubber compound, such as ethylene propylene, or other elastomeric compounds, the preferred compound being SANTOPRENE (a registered trademark of Monsanto), which is compressibly deformable in response to internal cell pressures of a given magnitude. The vent plug 18 must be compressibly deformable in response to internal cell pressures which are within the range of 100–500 pounds per square inch. Further, it is preferable if the vent plug 18 is compressibly deformable at pressures between 200 and 400 pounds per square inch and it is especially preferred that said vent plug 18 is compressibly deformable at pressures of approximately 350 pounds per square inch.

The vent plug 18 is held in place atop the vent perforation 16 of the cover plate 12 by means of a vent plug cap 20. More specifically, the vent plug cap 20 compresses the vent plug upon and slightly protrudin through the vent perforation 16 so as to assure a complete closure of said perforation. The vent plug cap 20 includes at least one vent opening 22. The vent plug cap 20 is disposed atop said vent plug 18, and in contact with the cover plate 12 of the reinforced cover assembly. Thereafter, said vent plug cap 20 is affixed to cover plate 12 by means of a metallurgical process, e.g. a projection welding process.

FIGS. 2A and 2B, illustrate the completed cover assembly described hereinabove. FIG. 2A is a prospective top view of the cover assembly 10 wherein the vent plug cap 20 having vent openings 22 is affixed to the cover plate 12 by means of the aforementioned projection weld. FIG. 2B illustrates a bottom prospective view of the reinforced cover assembly 10 including the cover plate and showing the vent perforation 16 formed therethrough.

By "compressibly deformable" is meant that at high pressures the vent plug deforms, e.g., upwardly against a vent plug cap 20, to allow the flow of gases through perforation 16, around the deformed vent plug 18, to and through the vent openings 22.

Returning again to FIG. 1, the reinforced cover assembly further includes a circular, compressible electrically insulating ring 24. The ring 24 is sealably affixed along the circumference of the cover plate 12. The insulating ring 24 is typically fabricated of a polymeric material, such as a polysulfone, which is electrically insulating and is capable of being deformed by the application of pressure thereto. The insulating ring 24 further includes a locking lip (not shown) which allows the ring 24 to be snapped into position around the cover plate 12.

Turning now to FIGS. 3A and 3B, there is illustrated therein top and bottom perspective views of the reinforced cover assembly 10 including the insulating ring 24. FIG. 3A illustrates a top perspective view of the said cover assembly 10, including the insulating ring 24, the cover plate 12, the reinforcing stiffening rib 14, and the vent plug cap 20 including vent openings 22. FIG. 3B has illustrated therein a bottom perspective view of a completed reinforced cover assembly 10 including the insulating ring 24 and the cover plate 12 having a vent perforation 16 formed therethrough. Also, illustrated therein are protrusions 26 which form a base upon which the vent plug cap 22 may rest. FIGS. 2A and 2B show the reinforcing stiffening rib 14 extending outwardly from the cell interior. It is to be understood that the rib 14 can also extend inwardly.

A reinforced cover assembly 10 of the type described hereinabove is adapted for a permanent seal with the cell can of a rechargeable cylindrical electrochemical cell, providing means to reliably and uniformly vent excessive internal cell pressure. The vent means is preferred over vent means of the prior art as it is resealable and reliable. The reinforced cover assembly illustrated herein is further adapted to function as the positive terminal of the rechargeable cell, in that it is electrically isolated from the cylindrical cell can of said cell, which cell can functions as the negative terminal of the rechargeable cell.

Turning now to FIG. 4, there is illustrated therein a work station 30 for assembling the reinforced cover assemblies 10 of FIG. 1. Specifically, the work station 30 includes a plurality of substations each of which are adapted to perform a specific function in the manufacture of reinforced cover assemblies 10.

The first substation, STATION 1 is adapted to feed the vent plug caps 20 of FIG. 1, cap side down onto a rotatable work table 32. STATION 1 comprises a vibrating bin 34 which orients vent plug caps 20 in the desired direction, and places them on a conveyor chute 36 which disposes them upon said rotatable work table 32.

The next substation, STATION 2 is adapted to dispose the ellipsoidol vent plug 18 of FIG. 1 inside the inverted vent plug caps 20 of FIG. 1 as the vent plug caps are rotated into position by the rotatable work table 32. STATION 2 comprises a vibrating part bin 38 which orients the vent plugs 18 in desired position and places them upon a conveyor chute 40 which disposes them in the inverted vent plug caps 20 as the inverted plug caps 20 passes before the chute opening 42.

The next substation, STATION 3 is adapted to position the reinforced cover plate 12 of the cover assembly upon the inverted vent plug cap 20 and vent plug 18 as the vent plug cap 20 and vent plug 18 are moved into position by the rotatable work table 32. STATION 3 comprises a vibrating part bin 44 designed and adapted to dispose the cover plates 12 in a configuration such that the stiffening rib 12 and seating protrusions 26 of FIG. 2B are facing the upturned surface of a vent plug cap 20. STATION 3 further comprises a conveyor chute 46 which disposes the cover plate upon the vent plug cap 20 as the vent plug cap 20 and vent plug 18 pass beneath the chute 46.

The next substation in the fabrication process of the reinforced cover assembly 10 is STATION 4. STATION 4 is a station adapted to weld the cover plate 12 to the vent plug cap 20. Specifically, at STATION 4 the rotatable work table 32 positions the assembly of the vent plug cap 20 having the vent plug 18 therein with the cover plate 12 thereover under a welding instrument adapted to projection weld the vent plug cap 20 to the cover plate 12.

Thereafter, the welded cover plate assembly is advanced to STATION 5. STATION 5 is adapted to test the pressure sensitivity of the vent plug 18. Specifically, at STATION 5 the cap is pressure tested. This is done by exerting an air pressure approximating the desired venting pressure of the cap, e.g., approximately 350 pounds per square inch upon the vent plug 18. This is done by forcing gas at high pressure through the vent perforation 16. The pressure applied through the vent 16 should deform the vent plug 18, allowing the compressed gas to escape through the vent openings 22 of the vent plug cap 20. Sensors (not shown) disposed beneath STATION 5 detect whether or not pressure has been relieved through the vent plug assembly. Cover assemblies failing to properly discharge pressures applied thereto are rejected, and at this point are designated to be separately collected at a later station. Cover assemblies 10 which properly vent pressures of 350 pounds per square inch are advanced by the rotatable work table 32 to the next substation.

The next substation in the fabrication of the reinforced cover assembly 10 is STATION 6 which is adapted to affix the compressable electrically insulating ring 24 along the circumference of the cover plate 12. Specifically, STATION 6 comprises a vibrating part bin 48 which is adapted to orient the insulating ring 24 in proper configuration. STATION 6 further includes a conveyor chute 50 which is adapted to dispose the insulator ring upon the almost completed cover plate assemblies 10 as the assemblies pass before the chute 50. STATION 6 is additionally adapted to snap said cover plate assemblies 10 into the seating lip (not shown) of the insulating ring 24. Thereafter, the rotatable work table 32 moves the completed reinforced cover assembly 10 into STATION 7. STATION 7 is adapted to unload the completed assemblies 10 from the work table 32 and dispose them in a collection bin 52.

Figure 5:
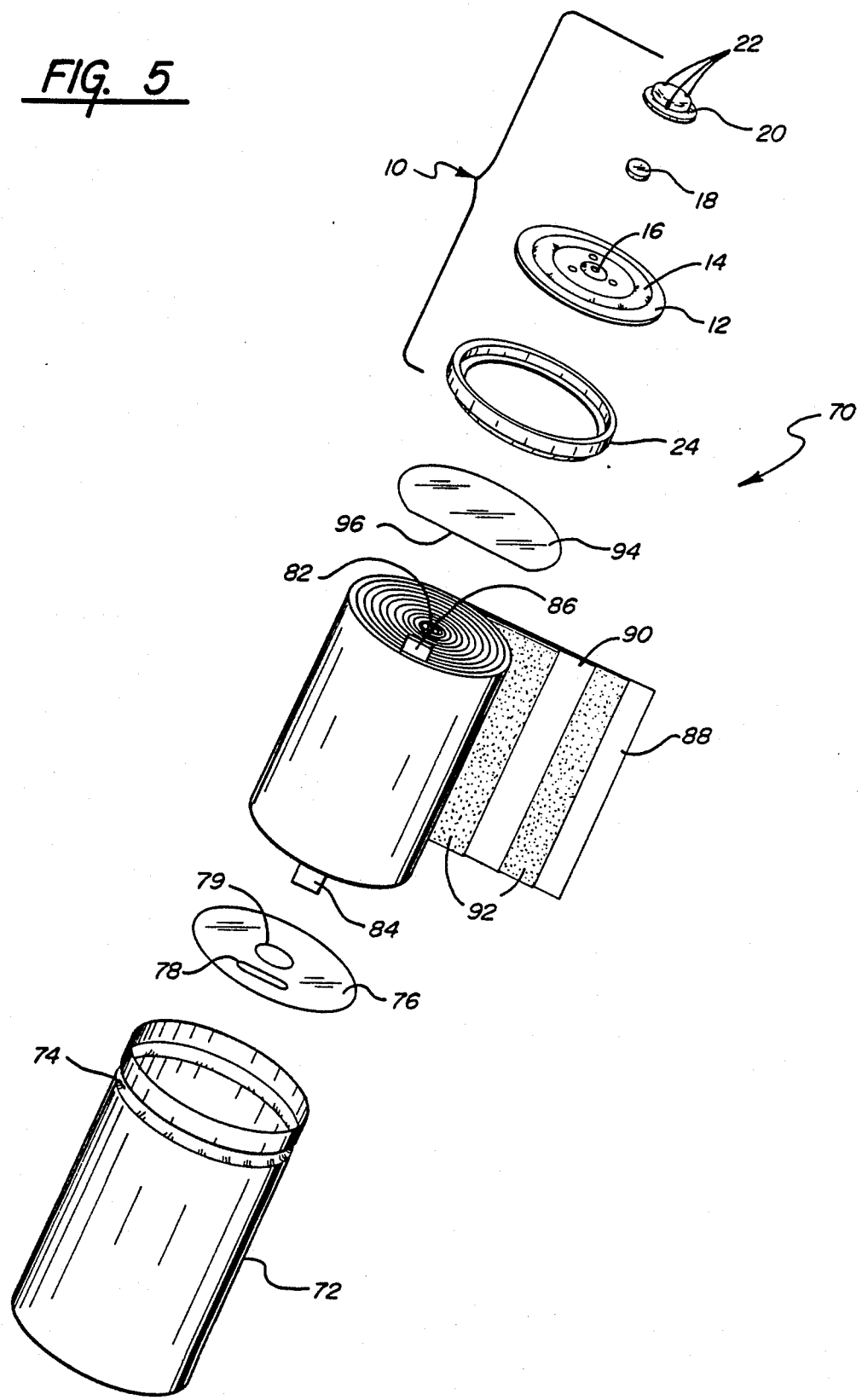
FIG. 5 is an exploded perspective view of a rechargeable, ventable electrochemical cell.

In FIG. 5 there is illustrated in exploded perspective view, a cylindrical ventable electrochemical cell for the storage of electrochemical energy. The electrochemical cell 70 is specifically adapted to be sealed by the reinforced cover assembly described hereinabove in reference to FIGS. 1-4. Specifically, the cover assembly 10 of FIGS. 1-4 is employed here so as to provide a ventable reinforced seal for the rechargeable electrochemical cell. The cover assembly herein includes the vent plug cap 20 preferably fabricated from nickel plated steel. The vent plug cap 20 additionally should include one and preferably three vent holes 22 adapted to permit the escape of internally generated pressure. The cover assembly 10 can further include an elliptically shaped vent plug 18 formed of a rubber or rubber-like materials such as an ethylene propylene diene or other elastomeric material, the perffered material being SANTOPRENE (a registered trademark of Monsanto). The vent plug 18 is compressibly deformable at imposed pressures in excess of at least 200 psi. More preferably, the vent plug 18 should be compressibly deformable at internal cell pressures in the range of 300 to 400 pounds per square inch.

The reinforced cover assembly 10 further includes the cover plate 12 which is again preferably a nickel-plated steel cylindrical plate having an axial stiffening rib 14 formed therein so as to reinforce said plate 12 and to maintain a uniform outward pressure towards the circumferential edges of said plate, particularly in response to radial compression. By maintaining a uniform outward pressure, the cell can of the electrochemical cell may be closed upon said cover assembly employing lower levels of compression. Specifically, in order to seal cells of the prior art, it was necessary to compress the cell can walls upon the cover assembly at extremely high pressures, so high in fact, that the pressure often resulted in shattering the insulating ring disposed around the cover. The cover assembly 10 described herein may be sealed at substantially lower pressures, since the cover plate urges itself against the cell can, thereby assuring an air-tight insulating seal.

The cover plate 12 further includes a vent perforation 16 which allows excess internal cell pressure to be vented from the cell. Specifically, and as described hereinabove as internal cell pressure reaches a critical value or range, the vent plug 18 is compressibly deformed so as to allow the pressure to escape through he vent perforation 16 around the vent plug 18 and out the vent holes 22 of the vent plug cap 20. The vent plug cap 20 is disposed atop the vent plug 18 and is fixably attached to the cover plate 12, as by welding. The reinforced cover assembly 10 further includes a circular, compressible, electrically insulating ring 24 which is sealably affixed along the circumference of the cover plate 12. The insulating ring 24 is preferably fabricated from a polymeric material such as a polysulfone, which may be coated with an asphalt-like material and which is easily deformable so as to conform to the shape and contours of the cover plate 12 and the cell can of the electrochemical cell.

The electrochemical cell 70 further includes a cell can 72 which is typically a nickel-plated steel case in a cylindrical can configuration. The cylindrical nickel-plated steel case employed as the cell can 72 is further adapted to function as the negative terminal of the rechargeable electrochemical cell. The cell can 72 further comprises a stiffened sealing lip formed near the top of the cylindrical cell wall portion of said cell can. The stiffened sealing lip is adapted for supporting and sealing the cover assembly 10 described hereinabove. Disposed inside said cylndrical can 72 is an insulator pad 76 which is adapted to substantially electrically insulate the cylindrical cell can 72 from an electrode roll 80 disposed therein. Specifically, the electrical insulator pad 76 is a thin insulator, as an organic, polymeric material having a cutout portion 78 so as to provide a means for allowing an electrical contact between the negative electrode and the cell can 72. In a preferred embodiment the insulator pad is a 0.010" thick, type 6 nylon, and further includes a small hole 79 through the center thereof. Said hole 79 is adapted to facilitate the welding of the electrical contact tab to the cell can.

The electrochemical cell 72 further includes a positive and negative electrode isolated from one another by a separator means. Said electrodes and separator are wound into a jelly roll electrode unit 80. Jelly roll electrode unit 80 specifically comprises a negative electrode 88 which is itself a reversible multicomponent, multiphase electrochemical hydrogen storage alloy comprising titanium, vanadium, zirconium, nickel and chromium and having the nominal composition; $(Ti_{2-x}Zr_{x-}V_{4-y}Ni_y)_2 Cr_{1-z}$, where 0.0 is less than or equal to x which is less than or equal to 1.5, 0.6 or is less than or equal to y which is less than or equal to 3.5 and z is an effective amount less than 0.2. The hydrogen storage alloy is capable of electrochemically charging and discharging hydrogen in the alkaline aqueous media, the electrolytic material discussed hereinafter, vanadium and said multicomponent hydrogen storage phase normally being soluable in the alkaline, aqueous media and the chromium acting to inhibit the solubalization of vanadium into the aqueous alkaline media. Hydrogen storage electrodes of this type are fully disclosed in U.S. patent application Ser. No. 121,261, filed Nov. 16, 1987 and incorporated herein by reference.

The jelly roll electrode unit 80 further comprises the positive electrode 90 which is typically fabricated from a nickel hydroxide material of the type commonly known in the art. Also included in the jelly roll electrode unit 80 is separator means 92 which is positioned between the negative electrode 88 and the positive electrode 90. The separator is typically felted or non-woven material such as nylon, having a thickness in the range of 0.005 and 0.020 inches. It is important to note that while nylon is a preferred separator material, other materials may be employed without departing from the spirit or scope of the invention. Whatever material is chosen as a separator 92 it is necessary that it be thick enough to prevent electrical shorting between the positive and negative electrodes 88 and 90 but not so thick so as to present problems of electrolyte transmissability. Additionally, the separator means 92 may not be so thick as to present problems with high electrical resistance in the jelly roll electrode unit 80. The jelly roll electrode unit 80 further includes a negative electrode contact tab 84 which is attached to the negative electrode plate and is adapted to extend through the cutaway section 78 of insulator pad 76 so as to affect an electrical contact with cell can 72. The jelly roll electrode unit 80 is further equipped with a positive electrode contact tab 86 which is attached to the positive electrode and is adapted to affect an electrical contact with the cover assembly 10 of the electrochemical cell.

Also disposed in the cell can 72, so as to wet and flood, the jelly roll electrode unit 80, is an electrolyte material (not shown). The electrolyte is an aqueous alkaline solution, for example, a solution of distilled water containing from about 20 to about 40 percent potassium hydroxide.

Disposed atop the jelly roll electrode unit 80 inside the cell can 72 is a second electrical insulator pad 94 having a cut away portion 96 which allows the positive electrode electrical contact tab 86 to extend therethrough so as to provide electrical communication to the cell cover assembly 10 thereby making the cell cover assembly 10 the positive terminal. The electrical insulator pad 94 is similar to that discussed hereinabove and that it is typically fabricated from electrically insulating material such as an organic polymeric insulator, e.g., nylon.

According to a further exemplification of the invention there is provided a method of sealing a cylindrical, ventable, electrochemical cell, said electrochemical cell including a positive electrode, a negative electrode, a separator means operatively disposed between said electrodes, an electrolyte, a cylindrical cell can and a reinforced cover assembly for sealing the cylindrical cell can. FIGS. 6 through 14 illustrate the steps necessary to assemble and seal the rechargeable, cylindrical, ventable, electrochemical cell described in detail hereinabove. Specifically, in employing the references and descriptions set out above with regard to FIG. 5, there is disclosed in FIG. 6 a cylindrical cell can 72 into which has been disposed the first electrical insulator pad 76 adapted insulate the end sections of the jelly roll electrode unit 80 from the bottom of the cell can 72. It is important to note that the stiffened sealing lip 74 of cell can 72 illustrated in FIG. 5 has not yet been formed in said cell can 72. This is because the stiffened sealing lip 74 serves the additional function of "locking" the jelly roll electrode unit 80 into position so as to prevent it from moving about inside the cylindrical can 72. Additionally, as illustrated in FIG. 6 the jelly roll electrode unit 80 is disposed inside said cell can 72 so that the positive electrode electrical contact tab 86 extends upward towards the open portion of cylindrical cell can 72, while the negative electrode electrical contact pad 84 (not shown) extends downward through a cutaway section 78 of the first insulator pad 76 and is bent so as to make electrical contact with the bottom of cell can 72.

FIG. 7 illustrates the step of bendably deforming the cylindrical wall portion of cell can 72 at a level above the jelly roll electrode unit 80 so as to form a stiffened sealing lip 74 therein. The stiffened sealing lip 74 serves the dual function of "locking" the jelly roll electrode unit 80 into position within the cylindrical cell can 72, as well as providing a sealing lip upon which the reinforced cover assembly 10 will be disposed and held in position. The cylindrical cell wall of the cell can 72 may be deformed by employing any of a number techniques which are well-known in the art for bending and forming sheet metals.

FIG. 8 illustrates the step of disposing an electrolyte material 100 which is typically a 20–40 percent solution of potassium hydroxide in distilled water into the cylindrical cell can 72. The electrolyte solution 100 is disposed directly atop the jelly roll electrode unit 80 so as to be absorbed completely by the separator means 90 within the jelly roll electrode unit 80. It is important to note that the level of the electrolyte material 100, at the time at which the cell is sealed, should not exceed the level as defined by the stiffened sealing lip 74.

FIG. 9 illustrates the step of attaching the reinforced covers assembly 10 to the positive electrical contact tab 86. The reinforced cover assembly 10 comprises a reinforced cover plate 12 having an axial rib 14 formed therein, and a vent perforation 16 preferably formed at substantially the center of the said cover plate 12 so as to allow the escape of internally generated cell pressure. The reinforced cover assembly 10 further includes a compressible electrically insulating ring 24 disposed along the circumference of the cover plate 12. FIG. 9 specifically depicts the attachment of the cover plate assembly 10 to the positive electrode electrical contact tab 86 by a weld means 102 which makes a pin point weld 104, attaching the positive contact tab 86 to the cover plate 12.

FIGS. 10 and 11 then depict the final two steps prior to the actual sealing of the rechargeable electrochemical cell. FIG. 10 depicts disposing a second electrical insulator pad 94 atop the jelly roll electrode unit 80 in the cylindrical cell can 72. The electrical insulator pad 94 further includes a cutaway portion 96 adapted to allow the positive electrode electrical contact tab 86 to extend therethrough to the cell cover assembly 10. A function of the electrical insulating pad 94 is to prevent an electrical short circuit from occurring between the cover assembly 10 and the top end portion of the jelly roll electrode unit 80.

FIG. 11, illustrates the step of bendably positioning the reinforced cover assembly 10 and its electrical insulating ring 24 over and atop the insulator pad 94 so that it rests firmly upon the sealing lip 74 of the cylindrical cell can 72. Clearly exposed in this figure is the vent plug cap 20 which facilitates the venting of excess gases which may be generated inside the cylindrical cell can after it is sealed.

Figure 12:
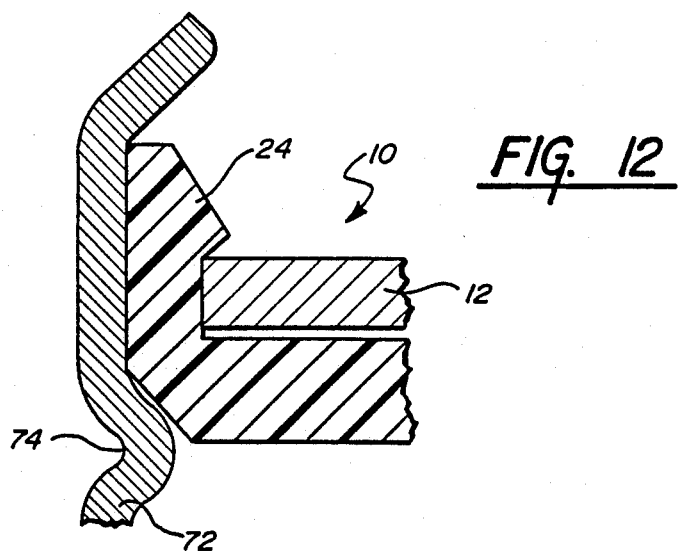
FIGS. 12 through 14 illustrate in cut-away perspective view the closure of a rechargeable electrochemical cell, specifically, the folding of the cell can walls upon the reinforced cover assembly.
Figure 13:
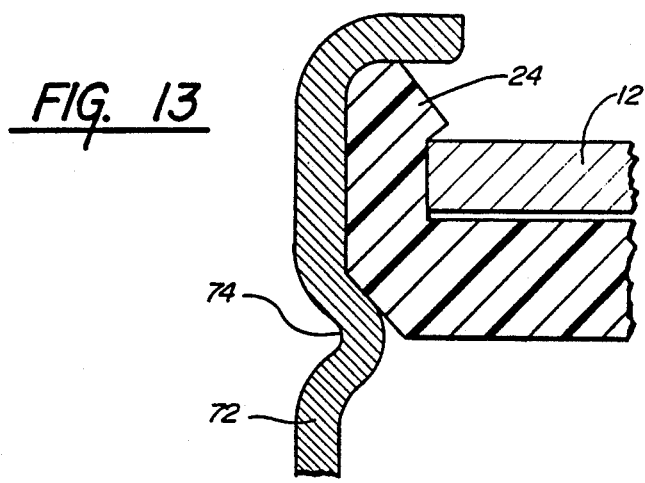

The step of sealing the cylindrical ventable electrochemical cell includes bendably deforming the cylindrical wall portions of the cell can 72 so as to close the wall portions over and upon the cover assembly 10 while maintaining electrical isolation therefrom by means of the compressable insulating ring 24 sealably affixed to the circumference of cell cover plate 12. The step of sealing the cylindrical cell wall portions over and upon the cover plate 12 is actually a three step process illustrated in FIGS. 12, 13 and 14. In FIG. 12, cylindrical cell can 72 is bendably deformed by means of a double acting die so as to bend cylindrical cell wall portions of said cylindrical cell can 72 inwardly at a level above the sealing lip 74 and the reinforced cover assembly 10 to an angle of less than 90° from their original position. Thereafter, as illustrated in FIG. 13, a second section of the die press means (not shown) bends the wall portions of cylindrical cell can 72 to a second angle which is substantially perpendicular or at right angles to the original position of the cell wall portion. It is noteworthy to observe that as the cell wall portion is bent over upon compressible insulating ring 24, the compressible insulating ring 24 deforms so as to continually maintain an insulating seal between the cover plate 12 and the cylindrical cell wall portions.

Figure 14:
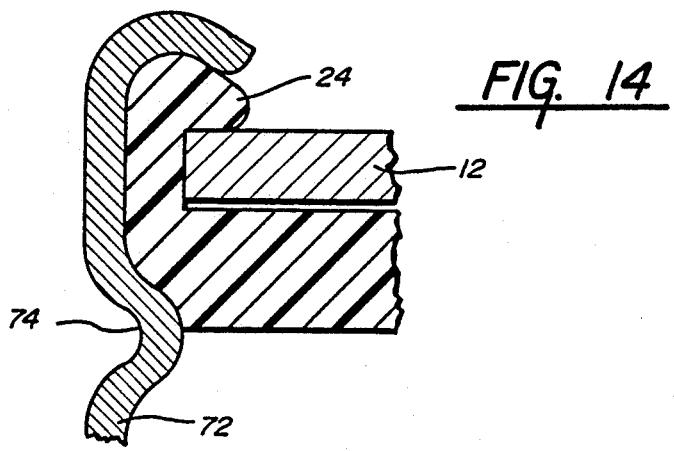

In FIG. 14, a third deforming means (not shown) radially compresses and curls the end portion of the cylindrical cell walls 72 over and upon the compressable insulating ring 24 of the cover assembly 10. The amount of radial compression is approximately 10,000 pounds per square inch, well below the shatter point of the insulating ring 24. It is also noteworthy to observe that at all times as the wall portions 72 are curled over and upon the compressable, insulating ring 24, the insulating ring conforms itself to the bent cell wall portions so as to maintain an insulating seal layer between the positive cover plate 12 and the negative cell wall portion 72. Also noteworthy, is the contribution of the axial rib 14 in FIG. 1. As the cell wall 72 is deformed, it exerts a radial compression upon both the insulating ring 24 and the cover plate 12. The axial rib 14, in response to this radial compression, exerts an outward force which assues a uniform, constant, permanent seal with the cell can. It is important to note that the sealing pressures exerted upon the cell can 72 and cover assembly 10 are well below the shatter point of the insulating ring 24. This is because the outward force exerted by the stiffening rib 14 assures a uniform, airtight seal without the need for excessive pressures as was required in the prior art.

While the invention has been described with respect to certain preferred exemplifications and embodiments thereof, it is not intended to limit the scope of the invention thereby but solely by the claims appended hereto.

We claim:
1. A method of sealing a cylindrical, ventable electrochemical cell, said cell including a positive electrode, a metal hydride, hydrogen storage negative electrode, a separator means operatively disposed between said electrodes, an electrolyte, an insulated, reinforced cover assembly and a cylindrical cell can, said method comprising the steps of:
  assembling said electrodes and separator means in a rolled configuration so that said metal hydride, hydrogen storage negative electrode forms the outermost layer thereof;
  disposing said electrode roll and said electrolyte in said cell can, so that only said negative electrode contacts said cell can;
  bendably deforming the cylindrical wall portion of said cell can at a level above the electrode roll so as to form a stiffened sealing lip;
  disposing a reinforced cover assembly atop said sealing lip and in contact with said positive electrode, said reinforced cover assembly including a circular, reinforced cover plate having an axial stiffening rib and a vent perforation formed there- through; a compressible, electrically insulating ring formed of a polysulfone, which insulating ring is sealably affixed along the circumference of said cover plate, and an elastic vent plug disposed top said vent perforation, said vent plug being compressibly deformable in response to cell pressures in the range of 200 to 500 psi, and a nickel plated steel vent plug cap disposed atop said vent plug and operatively affixed by metallurgical means to said cover plate;

folding an area of said wall portions above said sealing lip inward for a first angle, said angle being less than 90 degrees from said wall portions original position;

pressing said folded area over to assume an approximately 90 degree orientation to said cell walls;

curling said folded area over upon said insulated cover assembly to seal said electrolytic cell; and radially compressing said wall portions upon said cover assembly to affect an air tight seal.

2. The method as recited in claim 1, including the further step of providing positive and negative electrode contact tabs operatively affixed to said positive and negative electrodes respectively, so that one tab extends from one end of said electrode roll while the other tab extends from the opposite end of said roll.

3. The method as recited in claim 2, including the further step of providing first and second insulator pads disposed on the top and bottom of the electrode roll, such that one of said contact tabs extends through each of said insulator pads.

4. The method as recited in claim 3, including the further step of affixing said positive contact tab to said cover assembly.

5. The method as recited in claim 4, wherein the step of affixing said positive contact tabs to said cover assembly includes the further step of welding said tab to said cover assembly.

* * * * *